3,351,619
CROSSLINKABLE POLYMERS FORMED FROM IODINE - CONTAINING PERFLUOROALKYL VINYL ETHERS
Joseph Leo Warnell, Wilmington, Del., assignor to E. I. du Pont de Nemours and Company, Wilmington, Del., a corporation of Delaware
No Drawing. Filed Aug. 1, 1966, Ser. No. 569,112
6 Claims. (Cl. 260—80.76)

This application is a continuation-in-part of application Ser. No. 301,891 filed Aug. 13, 1963, by the same inventor.

The present invention relates to novel fluorocarbon vinyl ethers and their polymers and copolymers, and, more particularly, relates to fluorocarbon vinyl ethers and their polymers and copolymers which contain fluorocarbon alkyl iodide groups.

The fluorocarbon vinyl ethers of the present invention have the formula

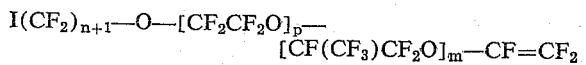

where $n$ is an integer from 1 to 8 inclusive, preferably 1 or 3, $p$ is an integer from 0 to 5 inclusive, and $m$ is an integer from 0 to 5 inclusive. The vinyl ethers are readily homopolymerized or copolymerized with halogenated alpha-olefins. Although the halogenated alpha-olefins are the preferred comonomers of the copolymerization of the vinyl ethers of the present invention, it is to be understood the copolymerization of the vinyl ethers can be achieved with any ethylenically unsaturated comonomers capable of homopolymerization, using the polymerization techniques described hereinbelow. Examples of the preferred halogenated alpha-olefins are those given by the general formula $CF_2=CRR'$, where R is H, F, Cl, or perfluoroalkyl and perfluoroalkoxy groups having from 1 to 3 carbon atoms such as $CF_3$, $CF_3O$, $C_2F_5O$ or $C_3F_7O$ and R' is H or F. Specific examples are $CF_2=CF_2$, $CH_2=CF_2$, $CFCl=CF_2$ and $CF_3OCF=CF_2$.

The vinyl ethers of the present invention are prepared by the pyrolysis of compounds having the formulas

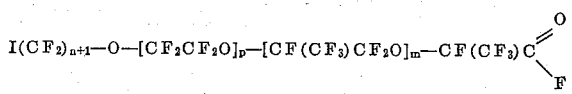

and

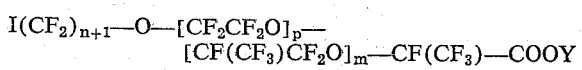

where $m$, $p$, and $n$ have the same meanings as above and Y is an alkali metal. The temperature at which pyrolysis is carried out is not critical and may range from about 175 to about 600° C., but is preferably between 200 to 400° C. In the case of the omega-iodoacid fluoride, pyrolysis is preferably carried out in the presence of an inorganic fluoride acceptor. Suitable inorganic fluoride acceptors include oxides of the alkali metals and alkaline earth metals, oxides of zinc, cadmium, mercury, lead and tin, sodium carbonate, and the oxides of silicon and germanium. The preferred inorganic fluoride acceptors are zinc oxide, sodium carbonate and silica. The acid fluoride employed in the pyrolysis can be obtained by the reaction of hexafluoropropylene epoxide and an iodoperfluoroacyl fluoride and have the formula

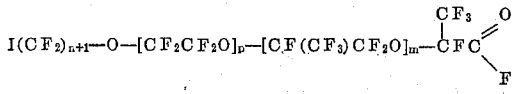

where $n$ is an integer from 1 to 8 inclusive, preferably 1 or 3, $p$ is an integer from 0 to 5 inclusive and $m$ is an integer from 0 to 5. The alkali metal salt may be formed from the corresponding omega-iodoacid fluoride by reaction with an alkali metal hydroxide or carbonate. The formation of the acid fluoride and the inorganic salt derivatives thereof is further disclosed in my copending applications Ser. No. 301,904, filed Aug. 13, 1963 and Ser. No. 569,018 filed on even date herewith.

The vinyl ethers of the present invention are preferably polymerized in a perfluorocarbon solvent using a perfluorinated free radical initiator. Since the vinyl ethers are liquid at reaction temperatures, it is further possible to polymerize and copolymerize the vinyl ethers in bulk without the use of a solvent. Polymerization temperatures are not highly critical and very widely from about —50 to about 100° C. depending on the degree of polymerization desired. In general, higher molecular weight polymers are obtained at the lower temperatures. Pressure is not critical and is generally employed to control the ratio of the gaseous comonomer to the fluorocarbon vinyl ether. Suitable fluorocarbon solvents are known in the art and are generally perfluoroalkanes or perfluorocycloalkanes, such as perfluoroheptane or perfluorodimethylcyclobutane. Similarly, perfluorinated initiators are known in the art and include perfluoroperoxides and nitrogen fluorides.

Polymeric fluorocarbon vinyl ethers of the present invention are liquid or solid depending on their degree of polymerization.

Crosslinking of the copolymers of the vinyl ethers with halogenated olefins is also possible. Further, crosslinking of tetrafluoroethylene copolymers (polytetrafluoro ethylene containing small amounts, e.g. 0.1 to 12 mole percent, of a monomer which makes the polytetrafluoroethylene melt fabricable) is possible, representing a new and novel chemical method for the production of crosslinked tetrafluoroethylene copolymers. The amount of vinyl ether required to crosslink either halogenated olefins or tetrafluoroethylene copolymers, such a tetrafluoroethylene/hexafluoropropylene polymer can be broadly described as a crosslinking amount; generally from 0.1 to 10 mole percent is adequate. Preferred vinyl ethers for this purpose have the formula $I(CF_2)_x$—$OCF=CF_2$ wherein $x$ is 2 or 4. All these copolymers may be crosslinked by heating them, preferably in an oxygen-free atmosphere at a temperature above 200° C. for a period of two to four hours. Alternatively, crosslinking may be effected by subjecting the copolymers to ultraviolet radiation for two to four hours above 200° C. At this elevated temperature there is a cleavage of the carbon-iodine grouping and substantially all the iodine is evolved as a vapor. Crosslinked halogenated olefin copolymers provide an improved resin of high strength and durability. The mechanical properties of such resins at elevated temperatures in excess of 100° C. are enhanced, thus permitting halogenated olefin copolymer coatings to be used at such elevated temperatures.

Crosslinked halogenated olefin copolymers also find application as improved plotting resins since they can withstand high temperatures. Other objects and advantages will be obvious from the following examples. While the present invention is further illustrated by the following examples, it is not intended to be limited to these examples.

*Example 1*

Hydrolysis of 12 grams of $ICF_2CF_2OCF(CF_3)COF$ was carried out by washing the liquid with water in a separatory funnel and separating the lower fluorocarbon layer. The fluorocarbon acid in methanol was neutralized with 10 normal NaOH in methanol to phenolphthalein end point. Evaporation of the methanol and water under vacuum left a dry salt which was dried for an additional two to four hours at 90° C. at 0.1 millimeter pressure. Pyrolysis of the dry salt at from 100 to 260° C. at one millimeter pressure over a three-hour period gave 3.1 milliliters of condensate in an attached Dry Ice trap. This material was fractionated by preparative scale, vapor phase chromatography to yield 5 grams of high purity β-iodotetrafluoroethyl trifluorovinyl ether having the formula, $ICF_2CF_2OCF=CF_2$. The infrared and NMR spectra of the product were consistent with the structure of the ether.

*Example 2*

The process of Example 1 is repeated except that $I(CF_2)_4OCF(CF_3)COF$ is used. The product of pyrolysis is predominantly 4-iodoperfluorobutyl perfluorovinyl ether. The product is identified by infrared and nuclear magnetic resonance spectroscopy.

*Example 3*

The process of Example 1 is repeated except that $I(CF_2)_4OCF_2CF_2OCF(CF_3)CFO$ is used. The product of pryolysis is $I(CF_2)_4OCF_2CF_2OCF=CF_2$. It is purified by preparative scale gas chromatography and identified by infrared and nuclear magnetic resonance spectra.

*Example 4*

Into a dry, "Pyrex" polymer tube, cooled to −190° C. containing 4 grams of perfluorodimethylcyclobutane as a solvent, was added 0.25 gram of $ICF_2CF_2-O-CF=CF_2$, 2.1 grams of tetrafluoroethylene and $2\times10^{-5}$ moles of nitrogen fluoride. The tube was sealed at −196° C. and slowly warmed to +25° C. at which point it was held for twenty-four hours to affect polymerization. The polymer tube was then cooled, opened and the solvent removed under vacuum to yield 2.35 grams of white copolymer. Infrared and differential thermal analysis of the polymer gave data which supported a homogeneous random copolymer structure.

Crosslinking of a 1 gram sample of the copolymer was effected by heating the polymer under vacuum at 325° C. for 2.5 hours with copious evolution of iodine vapor. The initially fluid polymer melt gradually set to a hard, tough crosslinked plug. Analysis of the product revealed data consistent with cleavage of the carbon-iodine grouping. The resin when hot pressed at 320° C. at 30,000 pounds per square in. pressure fractured to a fine granular powder typical of the crosslinked resin.

*Example 5*

The process of Example 4 is repeated except that 0.4 g. of the vinyl ether of Example 2 is used in place of 2-iodoperfluoroethyl perfluorovinyl ether. A homogeneous random copolymer of tetrafluoroethylene and 4-iodoperfluorobutyl perfluorovinyl ether is obtained. A compression molded film of this copolymer is crosslinked by heating to 320° C. for three hours under an atmosphere of oxygen-free nitrogen.

*Example 6*

The process of Example 5 is repeated except that 2 g. of vinylidene fluoride is substituted for the tetrafluoroethylene. The product is a homogeneous random copolymer of 4-iodoperfluorobutyl perfluorovinyl ether and vinylidene fluoride. A compression molded film of the copolymer is crosslinked by heating to 250° C. for four hours under an atmosphere of oxygen-free nitrogen.

*Example 7*

The process of Example 4 is repeated except that the charge consists of 4 g. of perfluorodimethylcyclobutane, 0.25 g. of $I(CF_2)_4OCF=CF_2$, 2.5 g. of tetrafluoroethylene, 1 g. of hexafluoropropylene and 0.1 mole percent $N_2F_2$ based on total monomers charged. The product is a random terpolymer of 4-iodoperfluorobutyl perfluorovinyl ether, hexafluoropropylene and tetrafluoroethylene. A compression molded film of the terpolymer is crosslinked by heating to 325° C. for four hours under an oxygen-free atmosphere of nitrogen.

The polymeric vinyl ethers of the present invention find utility as plastics and can be molded or extruded into a variety of shapes. The iodoperfluorovinyl ether homopolymers and copolymers are characterized by their ability to crosslink at elevated temperatures and on exposure to ultraviolet light. This property of these materials can advantageously be used to produce fluorocarbon articles having outstanding mechanical and chemical properties at elevated temperatures.

As many apparently widely different embodiments of this invention may be made without departing from the spirit and scope thereof, it is to be understood that this invention is not limited to the specific embodiments thereof except as defined in the appended claims.

What is claimed is:

1. A melt-fabricable crosslinkable copolymer consisting essentially from about 0.1 to about 10 mole percent of a fluorocarbon vinyl ether having the formula:

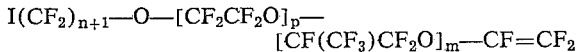

where $n$ is 1 or 3, $p$ is an integer from 0 to 5 inclusive, and $m$ is an integer from 0 to 5 inclusive and a halogenated monomer of the structure $RR'C=CF_2$ where R is a group selected from the class consisting of hydrogen, chlorine, fluorine and perfluoroalkyl and perfluoroalkoxy groups having from 1 to 3 carbon atoms and R' is a group selected from the class consisting of hydrogen and fluorine.

2. A melt-fabricable crosslinkable terpolymer consisting essentially of from about 0.1 to about 10 mole percent of a fluorocarbon vinyl ether having the formula:

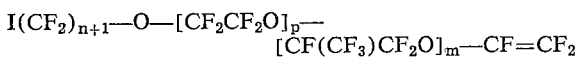

where $n$ is 1 to 3 $p$ is an integer from 0 to 5 inclusive, and $m$ is an integer from 0 to 5 inclusive, tetrafluoroethylene and hexafluoropropylene.

3. A melt-fabricable crosslinkable copolymer consisting essentially of from about 0.1 to about 10 mole percent of the fluorocarbon vinyl ether having the formula:

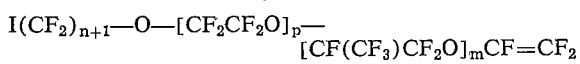

where $n$ is an integer from 1 to 8 inclusive, $p$ is an integer from 0 to 5 inclusive, and $m$ is an integer from 0 to 5 inclusive and tetrafluoroethylene.

4. A melt-fabricable crosslinkable copolymer consisting essentially of from about 0.1 to about 10 mole percent of the fluorocarbon vinyl ether having the formula $ICF_2CF_2OCF=CF_2$ and tetrafluoroethylene.

5. A melt-fabricable crosslinkable terpolymer consisting essentially of from about 0.1 to about 10 mole percent of the fluorocarbon vinyl ether having the formula $I(CF_2)_4OCF=CF_2$, hexafluoropropylene and tetrafluoroethylene.

6. The method of crosslinking the copolymer of claim 1 which comprises heating the copolmer to a temperature of at least 200° C. to evolve substantially all of the iodine of said vinyl ether.

References Cited

UNITED STATES PATENTS 3,159,609  12/1964  Harris et al. _____ 260—87.5

JOSEPH L. SCHOFER, *Primary Examiner.*

W. HOOVER, *Examiner.*

S. M. LEVIN, *Assistant Examiner.*